J. G. SMEBY.
CAMERA SPOOL SUPPORT.
APPLICATION FILED MAR. 28, 1916.
1,196,601.
Patented Aug. 29, 1916.
2 SHEETS—SHEET 2.
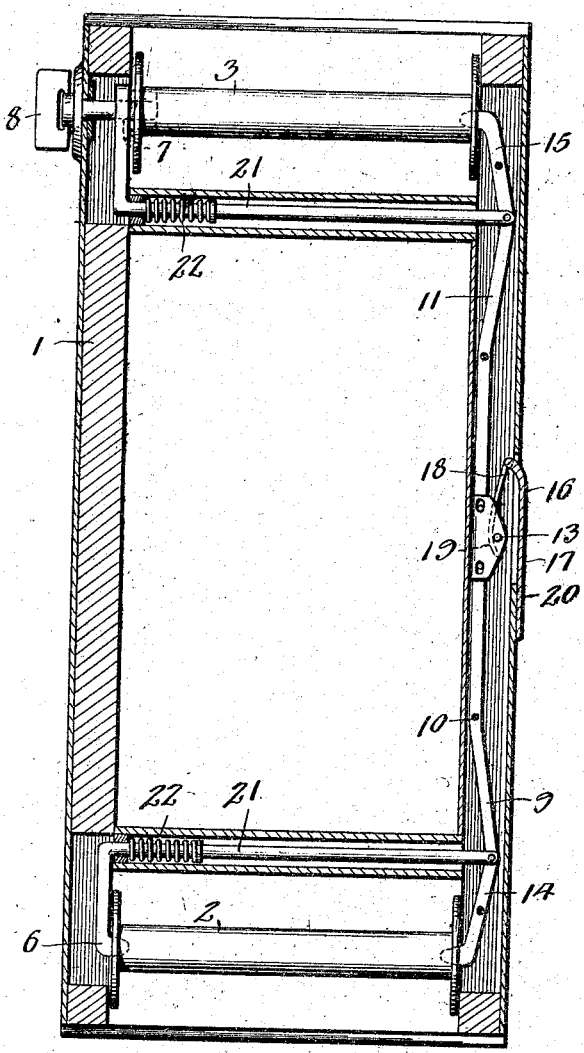
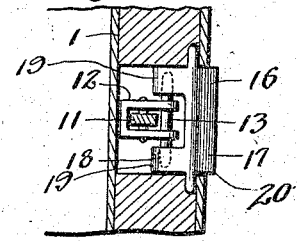
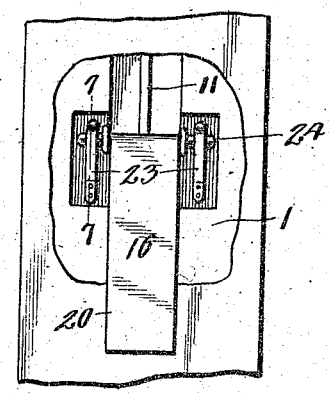
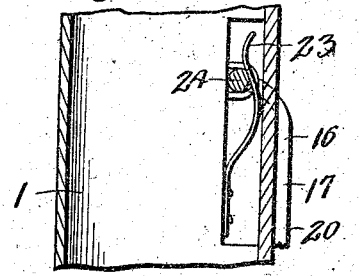
Witnesses
Inventor
J. G. Smeby,
By Victor J. Evans
Attorney

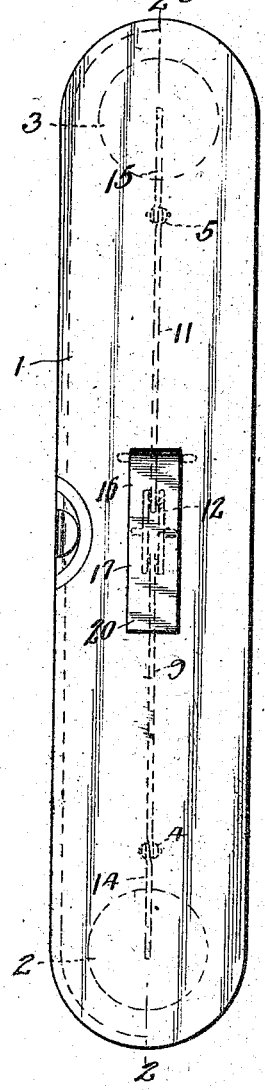
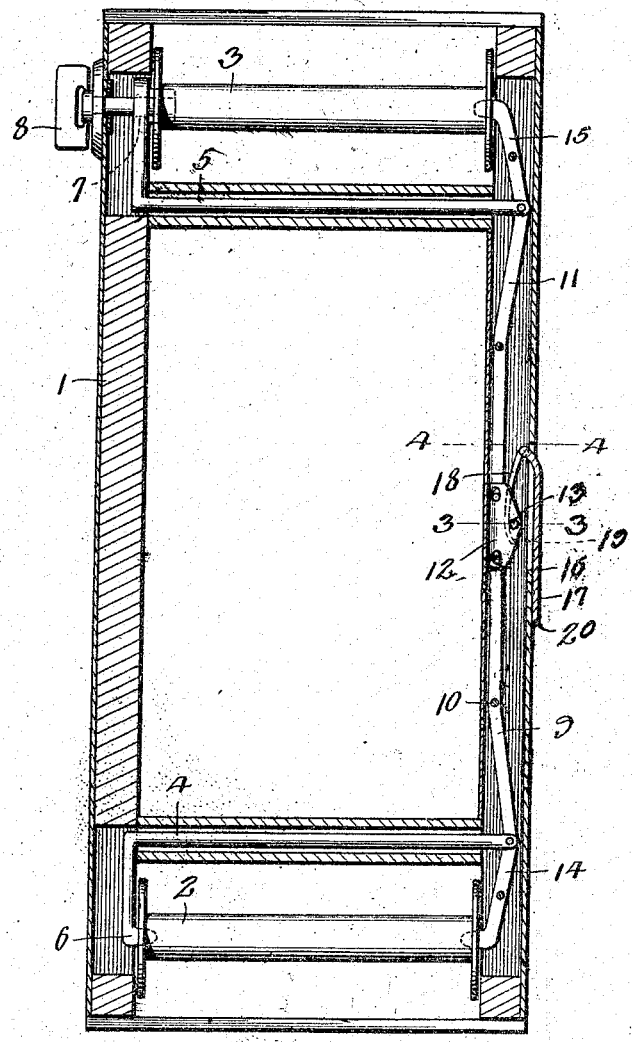
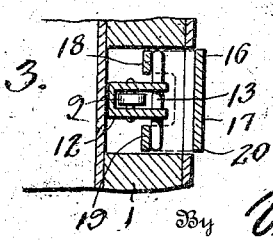

UNITED STATES PATENT OFFICE.

JUSTIN GARFIELD SMEBY, OF OBERON, NORTH DAKOTA.

CAMERA SPOOL-SUPPORT.

1,196,601.  Specification of Letters Patent.  Patented Aug. 29, 1916.

Application filed March 28, 1916.  Serial No. 87,249.

*To all whom it may concern:*

Be it known that I, JUSTIN GARFIELD SMEBY, a citizen of the United States, residing at Oberon, in the county of Benson and State of North Dakota, have invented new and useful Improvements in Camera Spool-Supports, of which the following is a specification.

This invention relates to supporting mechanism for the film spools of a camera by means of which at a single operation both spools may be released from the camera so as to be readily removed.

Besides the above my invention is distinguished in the arrangement of the elements so that the spools may be supported for rotation and the winding key thrown into its proper relation with one of the spools and this action being accomplished through the actuation of a single element manually. The invention will be better understood from the following detailed description taken in connection with the accompanying drawings wherein a preferred embodiment is illustrated and the features of novelty including the above mentioned and various others will be hereinafter pointed out in the appended claims.

In the drawings: Figure 1 is a side elevation of a camera showing my invention applied thereto. Fig. 2 is a sectional view on the line 2—2 of Fig. 1. Fig. 3 is a sectional view on the line 3—3 of Fig. 2. Fig. 4 is a sectional view on the line 4—4 of Fig. 2. Fig. 5 is a view similar to Fig. 2 showing a modified form of the invention. Fig. 6 is an elevation of the camera showing a further modification of the invention. Fig. 7 is a sectional view on the line 7—7 of Fig. 6.

Referring to the drawings the numeral 1 designates the casing of the camera in the ends of which are arranged the film supporting spool 2 and the film receiving spool 3. Slidably supported in the casing 1 is a pair of rods 4 and 5 of substantially L-shaped formation with the free end of the short arm of the rods 4 bent so as to engage the recess in one of the ends of the spool 2 as indicated at 6, while the short limb of the rod 5 is enlarged and provided with an opening 7 in which is rotatably mounted a key 8 by means of which one end of the spool 3 may be supported and the spool rotated. The rod 4 is pivotally connected to one end of a link 9 centrally pivoted upon the casing as shown at 10 whereas the rod 5 is similarly fitted to a centrally pivoted link 11.

The links 9 and 11 are arranged in horizontal alinement with their adjacent ends pivotally connected together by means of a plate or clip 12 which is provided with projecting lugs 13 and also pivotally connected to the link 9 is a centrally pivoted lever 14 having one end bent at an angle so as to engage the opening in the remaining end of the spool 2, while a similar located and shaped lever 15 engages the opening in the remaining end of the spool 3 and pivotally connected to the link 11.

The numeral 16 designates an actuator so shaped as to simultaneously move the links and in such a manner that excessive strain upon the actuator is properly taken care of. This actutor 16 is formed from a rectangular strip of metal 17 having a bifurcated end portion 18, the limbs 19 formed by the bifurcation being bowed rearwardly toward the body of the strip and as shown coöperate with the lugs 13. The strip 17 is further provided with lateral extending pintles rotatably mounted upon the casing. The finger grip portion 20 of the actuator is arranged exteriorly of the casing 1 so as to be gripped by the operator.

At this point I wish to call attention to the fact that owing to the arrangement of the limbs 19, lugs 13 and the finger grip portion 20 any undue strain brought to bear upon the portion 20 will be properly taken care of by the resiliency of the limbs 19 and thus it will be seen that the interiorly arranged elements of the invention is effectively protected against violent action.

In the modified form of my invention illustrated in Fig. 5, I have mounted upon each rod 21 a coil expansion spring 22 the purpose of which being to hold the levers and rods in engagement with the spools so that during rough usage of the camera the key, levers and rod will be prevented from accidentally moving from engagement with the spools. This latter result can be readily accomplished by the use of a leaf spring 23 engaging one of the pintles 24 of the actuator, the pintle being provided with flat faces so that the spring 23 can perform the dual function of holding the elements in engagement with the spools or in a position disengaged from the spools.

It is to be understood that while all of the several features of my improved device have special coöperation with one another and together constitute a particularly effective mechanism for the purpose in view, certain of these features may be applied in other relations. I therefore desire to cover the combinations present in the several parts of my improved device whether employed in the general organization shown or elsewhere.

What I claim is:

1. A support for the film spools of a camera comprising a pair of rods mounted in the camera and one of which being formed to engage one end of one spool, means supported by the other rod for supporting and winding the remaining spools, and means for simultaneously giving movement to said rods.

2. A support for the film spools of a camera comprising a pair of rods mounted in the camera, one of which being formed to engage one end of one spool, means carried by the other rod for engaging one end of the remaining spool, levers supported by the camera, and adapted to be thrown into engagement with the remaining ends of the spool, and a single element for giving movement to said levers and rods.

3. A support for the film spools of a camera comprising a pair of rods mounted in the camera, one of which being formed to engage one end of one spool, means carried by the other rod for engaging one end of the remaining spool, levers supported by the camera, and adapted to be thrown into engagement with the remaining ends of the spools, links for simultaneously giving movement to said rods and levers, and manually operated means for actuating said links.

4. A support for the film spools of a camera comprising a pair of rods mounted in the camera, one of which being formed to engage one end of one spool, means carried by the other rod for engaging one end of the remaining spool, levers supported by the camera, and adapted to be thrown into engagement with the remaining ends of the spools, links for simultaneously giving movement to said rods and levers, and a manually operated element having a yieldable connection with the links for actuating the latter.

5. A support for the film spools of a camera comprising a pair of rods mounted in the camera and one of which being formed to engage one end of one spool, means supported by the other rod for supporting and winding one end of the remaining spool, levers supported by the camera and engaging the remaining ends of the spools, and manually operated means for disengaging said rods and levers from the ends of the spools.

6. A support for the film spools of a camera comprising a pair of rods mounted in the camera and one of which being formed to engage one end of one spool, means supported by the other rod for supporting and winding one end of the remaining spool, levers supported by the camera and engaging the remaining ends of the spools, manually operated means for disengaging said rods and levers from the ends of the spools, and reslient means working in opposition to said first means.

7. A support for the film spools of a camera comprising a pair of rods one of which having one end formed to engage one end of one spool, a winding key supported by the other rod and engaging one end of the other spool, a pair of centrally pivoted levers having certain of the ends arranged to engage the remaining ends of the spools, links each having one end pivotally connected to a rod and lever, a plate pivotally connecting the links together, and an actuator having a yieldable connection with said plate.

In testimony whereof I affix my signature in presence of two witnesses.

JUSTIN GARFIELD SMEBY.

Witnesses:
S. O. BIDUE,
E. L. TABLER.